United States Patent
Sumitomo et al.

(10) Patent No.: US 8,299,143 B2
(45) Date of Patent: *Oct. 30, 2012

(54) CRAYON AND PROCESS FOR PRODUCING THE SAME

(75) Inventors: Kotaro Sumitomo, Sijonawate (JP); Masamitsu Takahashi, Sijonawate (JP); Hidetoshi Fukuo, Yao (JP)

(73) Assignee: Sakura Color Products Corporation, Osaka (JP)

( * ) Notice: Subject to any disclaimer, the term of this patent is extended or adjusted under 35 U.S.C. 154(b) by 213 days.

This patent is subject to a terminal disclaimer.

(21) Appl. No.: 12/439,455

(22) PCT Filed: Aug. 29, 2007

(86) PCT No.: PCT/JP2007/066771
§ 371 (c)(1),
(2), (4) Date: Jul. 28, 2009

(87) PCT Pub. No.: WO2008/029691
PCT Pub. Date: Mar. 13, 2008

(65) Prior Publication Data
US 2009/0326096 A1    Dec. 31, 2009

(30) Foreign Application Priority Data
Sep. 4, 2006 (JP) .................. 2006-239207

(51) Int. Cl.
*C09D 13/00* (2006.01)
(52) U.S. Cl. ........................ 523/164; 264/299
(58) Field of Classification Search .................. 523/164
See application file for complete search history.

(56) References Cited

U.S. PATENT DOCUMENTS

| | | | |
|---|---|---|---|
| 4,212,786 A | 7/1980 | Murakami | |
| 4,221,772 A * | 9/1980 | Eisenmenger et al. | 423/445 R |
| 6,203,910 B1 * | 3/2001 | Fukuo et al. | 428/413 |
| 6,451,100 B1 * | 9/2002 | Karl et al. | 106/31.9 |
| 2009/0247668 A1 | 10/2009 | Sumitomo et al. | |

FOREIGN PATENT DOCUMENTS

| | | |
|---|---|---|
| JP | 52-34825 | 3/1977 |
| JP | 54-81925 | 6/1979 |
| JP | 54-23619 | 8/1979 |
| JP | 55-14716 | 10/1980 |
| JP | 8-120209 A | 5/1996 |
| JP | 8-245916 A | 9/1996 |
| JP | 2001-254043 A | 9/2001 |
| JP | 2004-189951 | 7/2004 |
| JP | 2004-352741 A | 12/2004 |
| JP | 2004-240030 A | 9/2005 |
| JP | 2006-57083 | 3/2006 |
| JP | 2006-57083 A | 3/2006 |
| WO | WO 2006/093248 A1 | 9/2006 |

OTHER PUBLICATIONS

International Search Report of PCT/JP2007/066771, dated Nov. 6, 2007.
MDI@http://www.moderndispersions.com/images/PLACE%20HOLDER%20FOR%20DISPERSION.pdf (Sep. 8, 2010).
International Search Report of PCT/JP2007/063679, dated Aug. 21, 2007.
PTO 892 form issued in the Office Action for U.S. Appl. No. 12/373,130, mail date: Sep. 22, 2010.

* cited by examiner

*Primary Examiner* — Doris Lee
(74) *Attorney, Agent, or Firm* — Hamre, Schumann, Mueller & Larson, P.C.

(57) ABSTRACT

The invention provides a process for producing a crayon having a desired hardness stably without poor gelation using a benzylidene sorbitol gelling agent together with the use of carbon black as a black pigment. The process comprises:
dissolving and dispersing a resin component and carbon black having a pH of not less than 5.0 in an organic solvent,
dissolving at least one gelling agent selected from the group consisting of dibenzylidene sorbitol, tribenzylidene sorbitol and derivatives thereof in the resultant under heating to prepare a raw material solution,
pouring the raw material solution into a molding container, and
cooling and gelling the raw material solution.

8 Claims, No Drawings

CRAYON AND PROCESS FOR PRODUCING THE SAME

TECHNICAL FIELD

The present invention relates to a crayon and a process for producing the same. More particularly, the invention relates to a process for stably producing a crayon having a desired hardness without poor gelation using a benzylidene sorbitol gelling agent together with the use of carbon black as a black pigment.

BACKGROUND ART

A crayon containing a coloring agent, an organic solvent, a resin and a gelling agent as main components has been conventionally well known, and in particular, a crayon obtained by using a benzylidene sorbitol gelling agent is in wide use as it is practically excellent. Such a crayon that is obtained by using a benzylidene sorbitol gelling agent is prepared by a process, for example, which involves adding a resin component and a coloring agent to an appropriate organic solvent and dissolving or dispersing them therein to prepare a solution, adding thereto a benzylidene sorbitol gelling agent and dissolving it therein under heating to prepare a raw material solution, pouring the solution into a cylindrical molding container, for example, and then cooling and gelling (solidifying) the same (see Patent Literature 1).

In such a process for producing a crayon as mentioned above, when carbon black is used as a coloring agent, poor gelation frequently occurs in a final gelling process, resulting in that a crayon cannot be stably produced. More specifically, carbon black and a resin component are dispersed and dissolved, respectively, in an organic solvent, a benzylidene sorbitol gelling agent is dissolved in the resultant solution under heating to prepare a raw material solution, the raw material solution is poured into a molding container, depending on the case, while continuously heating the raw material solution so that the gelling agent remains dissolved in the raw material solution, and when the solution is cooled and solidified, it frequently happens that the gelling agent does not function, resulting in poor gelation. In particular, when the raw material solution is heated for a long time, there arises a tendency that poor gelation takes place very often.

When poor gelation occurs in this way, the crayon obtained does not have a desired hardness. Accordingly, the crayon is easy to collapse in writing, resulting in difficulty of writing. Depending on the case, the raw material solution does not gel, and thus a crayon cannot be obtained. On the other hand, the heating time for dissolving the gelling agent in an organic solvent is short, it is difficult to dissolve the gelling agent completely therein, resulting in that a homogeneous crayon cannot be obtained.

Patent Literature 1: Japanese Patent Publication No. 54-23619

DISCLOSURE OF THE INVENTION

Technical Problems to be Solved

The invention has been made to solve the above-described problems involved in producing a crayon using a benzylidene sorbitol gelling agent together with the use of carbon black as a black pigment. Therefore, it is an object of the invention to provide a process for stably producing a crayon having a desired hardness without poor gelation.

Means to Solve the Problems

The invention provides a process for producing a crayon comprising dissolving and dispersing a resin component and carbon black having a pH of not less than 5.0 in an organic solvent, and then dissolving at least one gelling agent selected from the group consisting of dibenzylidene sorbitol, tribenzylidene sorbitol and derivatives thereof in the resultant under heating thereby preparing a raw material solution, pouring the raw material solution into a molding container, and cooling and solidifying the raw material solution.

The invention further provides a crayon which is obtainable by dissolving and dispersing a resin component and carbon black having a pH of not less than 5.0 in an organic solvent, and then dissolving at least one gelling agent selected from the group consisting of dibenzylidene sorbitol, tribenzylidene sorbitol and derivatives thereof in the resultant under heating thereby preparing a raw material solution, pouring the raw material solution into a molding container, and cooling and solidifying the raw material solution.

Effect of the Invention

According to the invention, carbon black having a pH of not less than 5.0 and a resin component are dissolved and dispersed, respectively, in an organic solvent, and then at least one gelling agent selected from the group consisting of dibenzylidene sorbitol, tribenzylidene sorbitol and derivatives thereof is dissolved in the resultant under heating thereby a raw material solution is prepared, the raw material solution is poured into a molding container, and cooled and solidified, thereby it is possible to stably produce a crayon having a desired hardness without poor gelation of the raw material solution.

BEST MODE FOR CARRYING OUT THE INVENTION

The process for producing a crayon according to the invention comprises dissolving and dispersing a resin component and carbon black having a pH of not less than 5.0 in an organic solvent, and then dissolving at least one gelling agent selected from the group consisting of dibenzylidene sorbitol, tribenzylidene sorbitol and derivatives thereof in the resultant under heating thereby preparing a raw material solution, pouring the raw material solution into a molding container, and cooling and solidifying the raw material solution.

In the process for production of a crayon of the invention, the organic solvent used is not particularly limited, and at least one selected from the group consisting of alcohols, glycols, glycol ethers, and glycol ether esters is preferably used. Specific examples of such a preferable organic solvent include: alcohols, such as methanol, ethanol, isopropyl alcohol, 3-methyl-3-methoxybutanol, and 3-methoxy-1-butanol; glycols, such as ethylene glycol, propylene glycol, diethylene glycol, and dipropylene glycol; glycol ethers, such as methyl ether, ethyl ether, propyl ether, butyl ether, and phenyl ether of the above-mentioned glycols; and glycol ether esters such as acetates of the above-mentioned glycol ethers.

Among the above, at least one selected from the group consisting of 3-methyl-3-methoxybutanol, ethylene glycol monobutyl ether, propylene glycol monomethyl ether, propylene glycol monopropyl ether, propylene glycol monobutyl ether, and dipropylene glycol monomethyl ether is particularly preferably used.

The amount of the organic solvent used is suitably determined depending on the other components, such as a coloring agent. The organic solvent is used usually in an amount of from 20 to 80% by weight, and preferably 30 to 65% by weight, based on the weight of crayon. When the amount of the organic solvent is excessively large, there is a possibility that it becomes difficult to integrally gel the necessary components. On the other hand, when the amount of the organic solvent is excessively small, it becomes difficult to dissolve the necessary components, resulting in a possibility that a uniform gel cannot be formed.

In the process for production of crayon of the invention, the resin component has generally a function of integrating the components used, as well as a function as a fixing agent for writing formed when writing is performed on a writing surface with the crayon obtained. In the process according to the invention, a film forming resin and an adhesive resin are preferably used in combination as the resin component.

In more detail, the film forming resin is intended to increase hardness of the crayon obtained and strengthen writing formed on a writing surface, and is not particularly limited insofar as such functions are given. In particular, cellulosic resin, such as cellulose acetate butyrate, ethyl cellulose and acetyl cellulose; vinyl resins, such as polyvinyl butyral resin, polyvinyl acetate resin, vinyl acetate-vinyl chloride copolymer resin, and vinyl acetate-ethylene copolymer resin; and the like, are preferably used. These film forming resins may be used singly or in combination of two or more.

On the other hand, the adhesive resin is intended to increase adhesion of writing formed with the crayon obtained to a writing surface, and is not particularly limited insofar as such functions are given. In general, ketone resin, xylene resin, polyamide resin, acrylic resin, maleic resin, terpene phenolic resin, alkylphenolic resin, and the like, are used. Furthermore, rosin ester and hydrogenated rosin ester are also used similarly as the adhesive resin. Examples of ketone resin include a condensate of cyclohexane and formaldehyde. Examples of xylene resin include a condensate of m-xylene and formaldehyde. Examples of polyamide resin include thermoplastic resin obtained by condensation polymerization of dimer acid and diamine or polyamine and having a molecular weight of about 4,000 to 9,000. Examples of acrylic resin include thermoplastic polyacrylic acid ester. These adhesive resins may also be used singly or in combination of two or more.

According to the invention, the ratio of the film forming resin and the adhesive resin is suitably determined depending on the other components. The weight ratio of the film forming resin: the adhesive resin is generally about 1:0.1 to 5, and preferably about 1:0.2 to 3. Further, the film forming resin and the adhesive resin are used in all usually in an amount of from 3 to 40% by weight, preferably from 6 to 35% by weight, based on the weight of crayon. When the amount of the resin component is excessively large, the hardness of the crayon obtained is excessively high and colorability and leveling properties are poor. On the contrary, when the amount of the resin component is excessively small, it becomes difficult to integrally gel the components in the production of crayon and the crayon obtained has no sufficient fixability and strength.

The gelling agent is a component for integrating the components into a solid. As such a gelling agent, at least one selected from the group consisting of dibenzylidene sorbitol, tribenzylidene sorbitol and derivatives thereof is preferably used.

Examples of derivatives of dibenzylidene sorbitol include compounds in which a benzene nucleus in a benzylidene group of dibenzylidene sorbitol is substituted with an alkyl group having 1 to 3 carbon atoms or a halogen atom at an arbitrary position. Specific examples thereof include [di(p-methylbenzylidene)]sorbitol, [di(m-ethylbenzylidene)]sorbitol, and [di(p-chlorobenzylidene)]sorbitol.

Examples of derivatives of tribenzylidene sorbitol include compounds in which a benzene nucleus in a benzylidene group of tribenzylidene sorbitol is substituted with an alkyl group having 1 to 3 carbon atoms or a halogen atom at an arbitrary position. Specific examples thereof include [tri(p-methylbenzylidene)]sorbitol, [tri(m-ethyl-benzylidene)]sorbitol, and [tri(p-chlorobenzylidene)]sorbitol. The above-mentioned gelling agents can be used singly or in combination of two or more.

The gelling agent is used usually in an amount of from 2 to 20% by weight, preferably from 3 to 10% by weight, based on the weight of crayon. It is not preferable to use an excessively large amount of the gelling agent because the hardness of the crayon obtained is too high, and thus the crayon has reduced colorability when writing. On the contrary, when the amount of the gelling agent is excessively small, it becomes difficult to integrally gel the components in the production of crayon.

In the process for production of crayon according to the invention, the carbon black used should have a pH of not less than 5.0. However, the carbon black may have a pH of not less than 5.0 alone, or the carbon black may have a pH of not less than 5.0 as a mixture of two or more. Therefore, for example, a mixture composed of a first carbon black having a pH of less than 5.0 and a second carbon black having a pH of not less than 5.0 and yet having a pH of not less than 5.0 can be used as the carbon black. The carbon black especially preferred in the invention is such one that has a pH of not less than 6.0 alone, or such one that has a pH of not less than 6.0 as a mixture of two or more.

When a raw material solution is prepared using carbon black having a pH of less than 5.0, the resulting raw material solution has a tendency towards poor gelation when it is cooled. According to the invention, because the raw material solution is prepared using carbon black having a pH of not less than 5.0, it is gelled without poor gelation, thereby a crayon having a desired hardness is stably produced.

The crayon of the invention may contain a third coloring agent that is substantially neutral may be used together with the carbon black. Such third coloring agent include, for example, a phthalocyanine pigment such as copper phthalocyanine blue, an indanthrene pigment, an azo pigment, a quinacridone pigment, an anthraquinone pigment, a dioxazine pigment, an indigo pigment, a thioindigo pigment, a perinone pigment, a perylene pigment, an indolenone pigment, and an azo-azomethine pigment, and, in addition thereto, titanium oxide and carbon black. Furthermore, as required, an inorganic pigment, such as iron oxide, red iron oxide, chromium oxide, calcium carbonate, clay, and talc, a fluorescent pigment, colored resin particles, a metallic flake pigment, such as aluminum powder, a so-called pearl pigment, etc., are used. Moreover, various extender pigments are also used as required. However, the third coloring agent usable is not limited to the above.

The carbon black is used in the range of from 2-50% by weight based on the weight of crayon. When the amount of the carbon black in the crayon is less than 2% by weight, the crayon obtained may make no sufficient color development. However, when the amount of carbon black exceeds 50% by weight, the relative proportions of the other components other than the carbon black are excessively low in the crayon obtained, and thus the functions of the components are not fully demonstrated, thereby failing to provide the crayon of the invention excellent in performance. Moreover, in the production of crayon, the viscosity of the raw material solution mentioned hereinbefore is excessively high, which makes it difficult to pour the solution into a molding container.

The preferred amount of carbon black in the crayon varies depending on the type of carbon black used, and is usually in the range of from 3-40% by weight, and most preferably in the range of from 4-10% by weight based on the weight of crayon.

The crayon of the invention, in addition to the above-mentioned components, may contain other components which are conventionally known as additives in a crayon, such as a surfactant, a plasticizer, an anticorrosive agent, a filler, a leveling agent, a viscosity controlling agent, a structural viscosity imparting agent, and a dryness imparting agent, as required. There may be mentioned as preferred plasticizers, for example, diethyl phthalate, dibutyl phthalate, dioctyl phthalate, butyl benzyl phthalate, 2-ethylhexyl epoxyhexahydrophthalate, 2-ethylhexyl sebacate, and tricresyl phosphate. Such a plasticizer is used to provide flexibility with writing formed with the crayon.

The crayon of the invention is produced preferably as follows using the above-mentioned components. More specifically, carbon black having a pH of not less than 5.0 and, if necessary, a third coloring agent are added to an organic solvent, if needed, under heating, and the resultant is stirred to disperse the carbon black therein, and then the resin component and, if necessary, other components are added to and dissolved in the resultant. The gelling agent is added to and dissolved in the resulting solution while the solution is heated, thereby to obtain a raw material solution. Then, the raw material solution is poured into a molding container having a desired shape, if required, while heating the raw material solution so that the gelling agent remains dissolved therein, and then the raw material solution is cooled and gelled, thereby stably providing the crayon of the invention having the desired shape.

The hardness of the crayon obtained in this way according to the invention can be suitably adjusted depending on the type and proportion of the organic solvent, the gelling agent, the resin, etc. used, and is suitably determined according to the intended use, and is generally from about 5-50 kg/cm$^2$, and preferably from 7-30 kg/cm$^2$.

EXAMPLES

The invention will be described with reference to the following examples and comparative examples, but the invention is not limited thereto. In the following, pH of carbon black was measured according to the method of testing of pigment (pH value) provided in JIS K 5101.

Example 1

5.0 parts by weight of carbon black (No. 30 manufactured by Mitsubishi Chemical Corporation, and having a pH of 8.0) was added to and dispersed in a mixed solvent composed of 11.0 parts by weight of ethylene glycol monobutyl ether, 19.0 parts by weight of propylene glycol n-butyl ether and 20.0 parts by weight of dipropylene glycol monomethyl ether while the mixed solvent was heated at a temperature of 30° C.

Then, 13.0 parts by weight of polyvinyl butyral resin (MOWITAL B-20H, manufactured by Kuraray Co., Ltd., and having an average degree of polymerization of about 300), 6.0 parts by weight of polyvinyl butyral resin (MOWITAL B-30H, manufactured by Kuraray Co., Ltd., and having an average degree of polymerization of about 500), 12.0 parts by weight of ketone resin ("Highlack 111" manufactured by Hitachi Chemical Co., Ltd.) and 3.0 parts by weight of polyamide resin ("Versamide 335" manufactured by Henkel Hakusui Corporation) were added to and dissolved in the resulting dispersion of carbon black at a temperature of 30° C., followed by addition of 5.0 parts by weight of butylbenzyl phthalate to the dispersion.

6.0 parts by weight of dibenzylidene sorbitol ("GELOL D", a gelling agent manufactured by New Japan Chemical Co., Ltd.) was added to and dissolved in the solution thus obtained containing the resin and the carbon black while heating the solution at a temperature of 130° C., to thereby obtain a raw material solution. The raw material solution thus obtained was poured into a cylindrical molding container, and was cooled to room temperature and gelled and solidified. The solidified substance was taken out as a crayon from the container.

Example 2

A crayon was obtained in the same manner as in Example 1, except using carbon black (Printex G manufactured by Degussa AG and having a pH of 9.0) and the components shown in Table 1 in the amounts shown in Table 1.

Example 3

A crayon was obtained in the same manner as in Example 1, except using the components shown in Table 1 in the amounts shown in Table 1.

Comparative Example 1

A crayon was obtained in the same manner as in Example 1, except using carbon black (Special Black 100 manufactured by Degussa AG and having a pH of 3.3) and the components shown in Table 1 in the amounts shown in Table 1.

Comparative Example 2

A crayon was obtained in the same manner as in Example 1, except using carbon black (MA-220 manufactured by Mitsubishi Chemical Corporation, and having a pH of 3.0) and the components shown in Table 1 in the amounts shown in Table 1.

Comparative Example 3

A crayon was obtained in the same manner as in Example 1, except using the components shown in Table 1 in the amounts shown in Table 1.

When each crayon was produced as described above, the degree of gelation of the raw material solutions was visually observed after 1 hour and 3 hours, respectively, from the point of time dibenzylidene sorbitol was added to the solution containing the resin and the carbon black, and then the solution was cooled to room temperature. The case where the raw material solution was gelled smoothly and the obtained crayon had an expected hardness was defined as A, the case where the raw material solution was gelled insufficiently and the obtained crayon was excessively soft was defined as B, and the case where the raw material solution was not gelled and crayon was not obtained was defined as C. The results are shown in Table 1.

TABLE 1

|  | Examples | | | Comparative | | |
| --- | --- | --- | --- | --- | --- | --- |
|  | 1 | 2 | 3 | 1 | 2 | 3 |
| Solvent: | | | | | | |
| Ethylene glycol monobutyl ether | 11.0 | 8.0 | 12.0 | 12.0 | 9.5 | 10.0 |
| Propylene glycol mono-n-butyl ether | 19.0 | 17.0 | 18.0 | 18.0 | 17.0 | 20.0 |
| Dipropylene glycol monomethyl ether | 20.0 | 29.0 | 21.0 | 20.0 | 25.5 | 19.0 |
| Coloring Agent: | | | | | | |
| Special Black 100 (having a pH pf 3.3) | | | | 5.0 | | 4.0 |
| Carbon black MA-220 (having a pH of 3.0) | | | | | 7.0 | |
| Printex G (having a pH of 9.0) | | 6.0 | 2.0 | | | 3.0 |
| Carbon black No. 30 (having a pH of 8.0) | 5.0 | | 3.0 | | | |
| Resin Component: | | | | | | |
| Polyvinyl butyral resin (having an average degree of polymerization of about 300) | 13.0 | 12.0 | 20.0 | 13.0 | 14.0 | 15.5 |
| Polyvinyl butyral resin (having an average degree of polymerization of about 500) | 6.0 | 6.0 | | 6.0 | 2.0 | 3.0 |
| Ketone resin | 12.0 | 9.0 | 15.0 | 15.0 | 16.0 | 11.0 |
| Polyamide resin | 3.0 | 6.0 | | | | 4.0 |
| Gelling Agent | 6.0 | 7.0 | 6.0 | 7.0 | 7.0 | 6.5 |
| Butylbenzyl Phthalate (Plasticizer) | 5.0 | | 3.0 | 4.0 | 2.0 | 4.0 |
| Degree of Gelation | | | | | | |
| After 1 hour | A | A | A | C | C | B |
| After 3 hours | A | A | A | C | C | C |

The invention claimed is:

1. A process for producing a crayon, comprising:
   dispersing carbon black in an organic solvent, thereby obtaining an organic dispersion, wherein the total of the carbon black used has a pH of not less than 5.0,
   dissolving a resin component in the organic dispersion, thereby obtaining a mixture of the resin component and the organic dispersion,
   dissolving at least one gelling agent selected from the group consisting of dibenzylidene sorbitol, tribenzylidene sorbitol and derivatives thereof in the mixture of the resin component and the organic dispersion under heating, thereby obtaining a raw material solution,
   pouring the raw material solution into a molding container, and
   cooling and gelling the raw material solution.

2. The process for producing a crayon according to claim 1, wherein the carbon black is a mixture composed of a first carbon black having a pH of less than 5.0 and a second carbon black having a pH of not less than 5.0.

3. The process for producing a crayon according to claim 1, wherein the carbon black is used in an amount of 4-10% by weight based on the weight of the crayon.

4. The process for producing a crayon according to claim 1, wherein the gelling agent is used in an amount of 3-10% by weight based on the weight of the crayon.

5. The process for producing a crayon according to claim 1, wherein the organic solvent is at least one selected from the group consisting of 3-methyl-3-methoxybutanol, ethylene glycol monobutyl ether, propylene glycol monomethyl ether, propylene glycol monopropyl ether, propylene glycol monobutyl ether, and dipropylene glycol monomethyl ether.

6. The process for producing a crayon according to claim 1, wherein the organic solvent is used in an amount of 30-65% by weight based on the weight of the crayon.

7. The process for producing a crayon according to claim 1, wherein the resin component comprises a film forming resin selected from the group consisting of a cellulosic resin and a vinyl resin and an adhesive resin selected from the group consisting of ketone resin, xylene resin, polyamide resin, acrylic resin, maleic resin, terpene phenolic resin, alkylphenolic resin, rosin ester and hydrogenated rosin ester, and wherein the film forming resin and the adhesive resin are used in a weight ratio of the film forming resin to the adhesive resin of about 1:0.1 to 1:5, and are used in an amount of 6 to 35% by weight based on the weight of the crayon.

8. A process for producing a crayon, comprising:
   dispersing carbon black in an organic solvent, thereby obtaining an organic dispersion, wherein the total of the carbon black used has a pH of not less than 5.0,
   dissolving a resin component in the organic dispersion, thereby obtaining a mixture of the resin component and the organic dispersion,
   dissolving at least one gelling agent selected from the group consisting of dibenzylidene sorbitol, tribenzylidene sorbitol and derivatives thereof in the mixture of the resin component and the organic dispersion under heating, thereby obtaining a raw material solution,
   wherein the raw material solution is such that when it is prepared by dissolving 6.0% by weight based in the weight of the resulting raw material solution of dibenzylidene sorbitol in the mixture of the resin component and the organic dispersion while the mixture is kept at a temperature of 130° C., and when the resulting raw material solution is kept at a temperature of 130° C. for three hours, followed by cooling to room temperature, the raw material solution gels smoothly,
   pouring the raw material solution into a molding container, and
   cooling and gelling the raw material solution.

* * * * *